US010938288B2

(12) United States Patent
Hsu et al.

(10) Patent No.: US 10,938,288 B2
(45) Date of Patent: Mar. 2, 2021

(54) ELECTRIC MOTOR STRUCTURE

(71) Applicants: YUZEN SUSTAINABLE ENERGY CO., LTD., Taichung (TW); YUZEN (HK) SUSTAINABLE ENERGY CO., LTD., Hong Kong (CN); YUZEN SUSTAINABLE ENERGY PTE LTD., Singapore (SG)

(72) Inventors: Yung-shun Hsu, Taichung (TW); Ming-chun Hsu, Taichung (TW); Wen-yu Hsu, Taichung (TW)

(73) Assignees: YUZEN SUSTAINABLE ENERGY CO., LTD., Taichung (TW); YUZEN (HK) SUSTAINABLE ENERGY CO., LTD., Hong Kong (CN); YUZEN SUSTAINABLE ENERGY PTE LTD., Singapore (SG)

( * ) Notice: Subject to any disclaimer, the term of this patent is extended or adjusted under 35 U.S.C. 154(b) by 216 days.

(21) Appl. No.: 16/094,882

(22) PCT Filed: Apr. 25, 2016

(86) PCT No.: PCT/CN2016/080099
§ 371 (c)(1),
(2) Date: Oct. 18, 2018

(87) PCT Pub. No.: WO2017/185196
PCT Pub. Date: Nov. 2, 2017

(65) Prior Publication Data
US 2019/0097511 A1 Mar. 28, 2019

(51) Int. Cl.
*H02K 33/18* (2006.01)

(52) U.S. Cl.
CPC ................... *H02K 33/18* (2013.01)

(58) Field of Classification Search
CPC ........ H02K 33/18; H02K 33/12; H02K 35/04; H02K 41/02; H02K 41/031
(Continued)

(56) References Cited

U.S. PATENT DOCUMENTS 5,214,323 A * 5/1993 Ueda ...................... H02K 41/03
310/12.01
6,617,712 B1 * 9/2003 Dondi .................. G01D 5/2046
310/10

(Continued)

*Primary Examiner* — Forrest M Phillips
(74) *Attorney, Agent, or Firm* — Leong C. Lei

(57) ABSTRACT

The electric motor includes at least two opposing magnet sets, at least a coil assembly, and a detection switch circuit. Each magnet set includes at least a magnet whose poles are arranged perpendicular to the movement of the magnet. The magnets in a same magnet set are stacked and have poles on a same side of reversed polarities. Opposing magnets from neighboring magnet sets have facing poles of a same polarity. The coil assembly is disposed between neighboring magnet sets, and axially parallel to an alignment direction between the facing poles of opposing magnets. Each coil assembly includes a magnetizer wrapped in a winding. Yokes are extended from two ends of the magnetizer towards opposite directions and a specific distance is between the yokes' centers. Together with the detection switch circuit's switching between positive and negative power supplies, the electric motor effectively reduces input power, and increases output power.

1 Claim, 8 Drawing Sheets

(58) Field of Classification Search
USPC .......... 310/12.01, 12.21, 12.22, 12.24, 12.25
See application file for complete search history.

(56) References Cited

U.S. PATENT DOCUMENTS

| | | | | |
|---|---|---|---|---|
| 6,680,558 B2* | 1/2004 | Akiba | .................... | G02B 7/102 |
| | | | | 310/12.01 |
| 7,474,019 B2* | 1/2009 | Kang | .................... | H02K 41/033 |
| | | | | 310/12.24 |
| 7,573,162 B2* | 8/2009 | Yura | ..................... | H02K 41/03 |
| | | | | 310/12.01 |
| 8,624,446 B2* | 1/2014 | Chung | .................... | H02K 1/14 |
| | | | | 310/12.15 |
| 2002/0053835 A1* | 5/2002 | Joong | .................. | H02K 41/031 |
| | | | | 310/12.21 |
| 2008/0024014 A1* | 1/2008 | Kang | .................... | H02K 41/033 |
| | | | | 310/12.24 |
| 2011/0193425 A1* | 8/2011 | Hiura | .................. | H02K 41/031 |
| | | | | 310/12.01 |

* cited by examiner

ELECTRIC MOTOR STRUCTURE

BACKGROUND OF THE INVENTION

(a) Technical Field of the Invention

The present invention is generally related to electric motors, and more particular to an electric motor having low input power and high output power.

(b) Description of the Prior Art

A convention electric motor produces high-speed rotation based on electromagnetism and, as shown in FIG. 1, it includes a stator 10 and rotor 20 that rotate relative to each other. The stator 10 has multiple windings 11 around an inner wall of the stator 10. The rotor 20 has multiple magnets 21 around the rotor's circumference corresponding to the windings 11. Electricity supplied to the windings 11 magnetizes the windings 11 and, as such, the windings 11 attract and expel the magnets 21 of the rotor 20 so that the rotor 20 turns at high speed.

When the conventional electric motor operates, the electricity is supplied in an intermittent manner. However, due to high magnetic flux and cutting number between the windings 11 and the magnets 21, the windings 11 would still be influenced by the magnets 21 under inertia motion to produce voltage when electricity is not supplied. As such, a higher power has to be applied to the electric motor so as to suppress this internally produced voltage. This leads to unnecessary energy waste. Additionally, a conventional electric motor usually has a ring design and magnetic force is produced from one side. Then, under an identical input power, the conventional electric motor has a poor output power.

In other words, if the voltage production when no electricity is supplied may be improved, the electric motor may be driven by a lower power. Furthermore, if the magnetic force may be enhanced, the output power may be effectively increased.

SUMMARY OF THE INVENTION

Therefore, a major objective of the present invention is to teach an electric motor having low input power and thereby reducing power loss by avoiding electricity generation when electricity is not applied.

Another major objective of the present invention is to teach an electric motor capable of reinforcing magnetic force during electricity provision and increasing output power.

To achieve the objectives, the present invention adopts the following technical means.

The electric motor includes at least two magnet sets, at least a coil assembly, and a detection switch circuit. The magnet sets and the coil assembly move relative to each other. The magnet sets are disposed at a distance and each includes at least a magnet whose poles are arranged perpendicularly to the movement of the magnet. The magnets in a same magnet set are stacked and have poles on a same side of reversed polarities. Opposing magnets from neighboring magnet sets have facing poles of a same polarity.

The at least one coil assembly is disposed between two neighbouring magnet sets, where the magnet sets and the at least one coil assembly conduct a relative movement, the at least one coil assembly is axially parallel to an alignment direction between the facing poles of opposing magnets, the at least one coil assembly comprises a magnetizer wrapped in a winding, and a front yoke and a back yoke are extended from two ends of the magnetizer towards opposite directions, the front yoke interacts first with a magnet in the relative movement, the back yoke interacts later with a magnet, and a specific distance is between the front and back yokes' centers.

The detection switch circuit disposed between the magnet sets and the at least one coil assembly, where the detection switch comprises at least a negative detector or at least a positive detector, and at least one break detector, each disposed at a pole on a magnet that interacts earlier with the front yoke of the at least one coil assembly in the relative movement, the negative detector is disposed at an N pole of a magnet having the N pole facing the at least one coil assembly, a the positive detector is disposed at an S pole of a magnet having the S pole facing the at least one coil assembly, the break detector is disposed at a pole on a magnet that interacts later with the back yoke of the at least one coil assembly in the relative movement. When the front detection element detects the negative detector or the positive detector, a positive or negative power supply is respectively applied to the at least one coil assembly. When the back detection element detects the break detector, the positive or negative power supply to the at least one coil assembly is cut off.

Furthermore, the front and back yokes are extended at an angle greater than right angle relative to the magnetizer so as to effectively increase the distance.

The electric motor, through the arrangement of the magnets in opposing magnet sets and the alignment of coil assemblies with the magnets and in opposing magnet sets, does not produce electricity when no electricity is applied, and produces dual magnetic forces. Furthermore, by having same polarity between of opposing magnet sets, reversed polarities between magnet sets and magnetizers, and the detection switch circuit's switching between positive and negative power supplies, the electric motor avoids the occurrence of magnetic resistance, enhances magnetic force, effectively reduce output power and increase output power.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
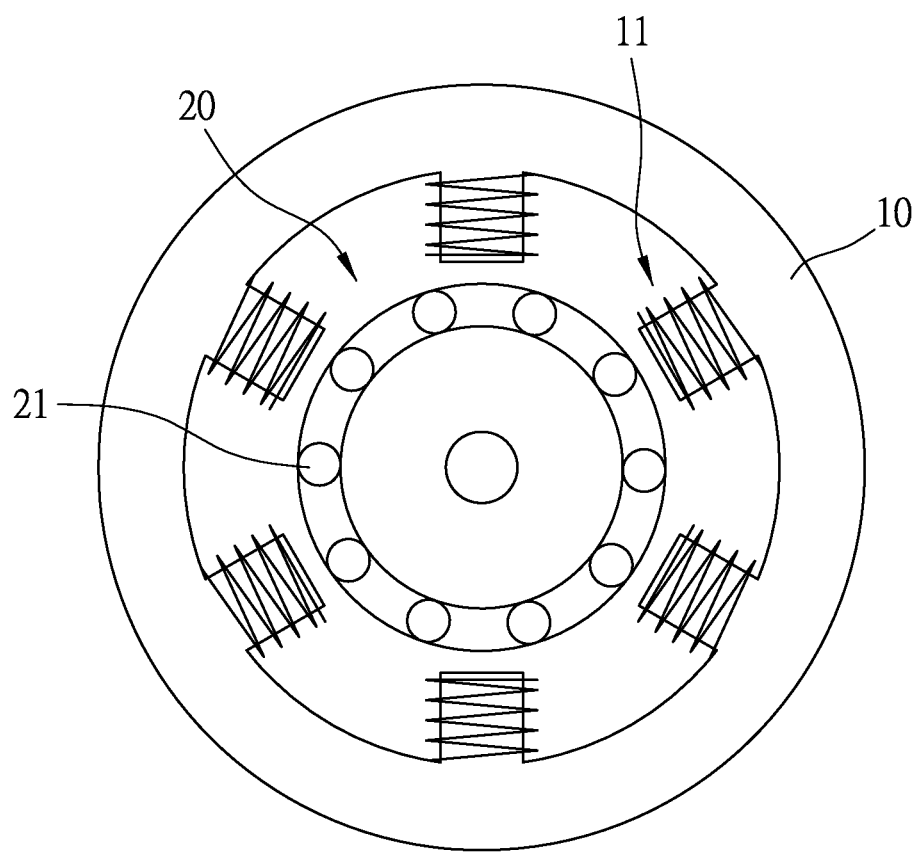
FIG. 1 is a schematic diagram showing a conventional electric motor.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In the following description, references to font and back, left and right, top and bottom, upper and lower, lateral and vertical directions and locations are based on the accompanied drawings. They are intended to facilitate the understanding of, not to limit, the present invention. They are also not to confine elements to specific location or direction. The various dimensions shown in the drawings or described in the specification may be varied according to the teaching of the present invention without departing the scope of the claims.

As shown in FIGS. 2A to 6C, an electric motor according to the present invention includes at least a pair of opposing magnet sets 50, at least a coil assembly 60, and a detection switch circuit 80. The pair of magnet sets 50 and the coil assembly 60 may rotate and linearly move relative each other synchronously. A first embodiment shown in FIGS. 2A to 3B has a single coil assembly 60 between the magnet sets 50. A second embodiment shown in FIGS. 4A and 4B has multiple coil assemblies 60 between the magnet sets 50. A third embodiment shown in FIGS. 5A to 6C involves multiple pairs of magnet sets 50 and multiple coil assemblies 60.

Figure 2A:
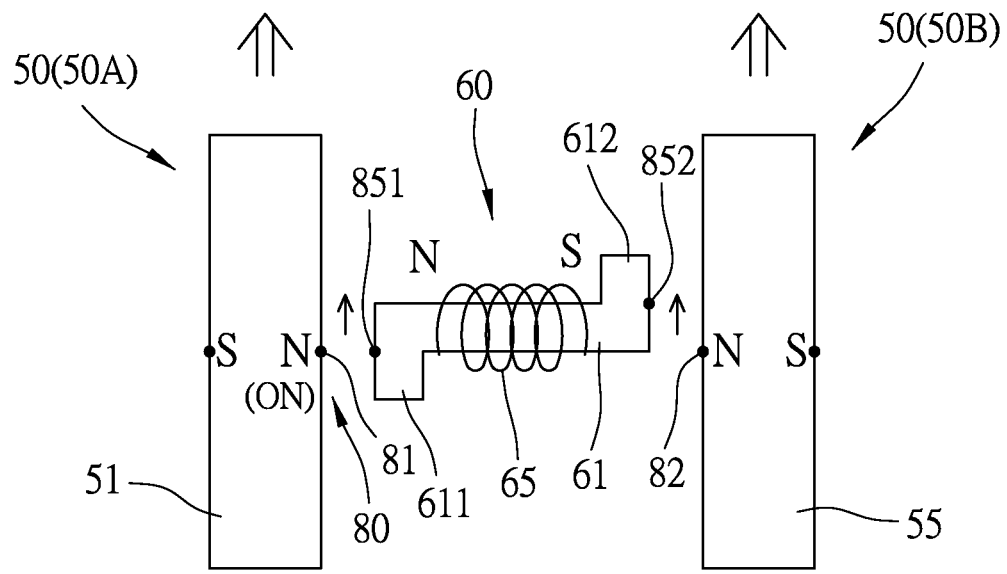
FIGS. 2A and 2B are schematic diagrams showing an electric motor according to a first embodiment of the present invention.
Figure 2B:
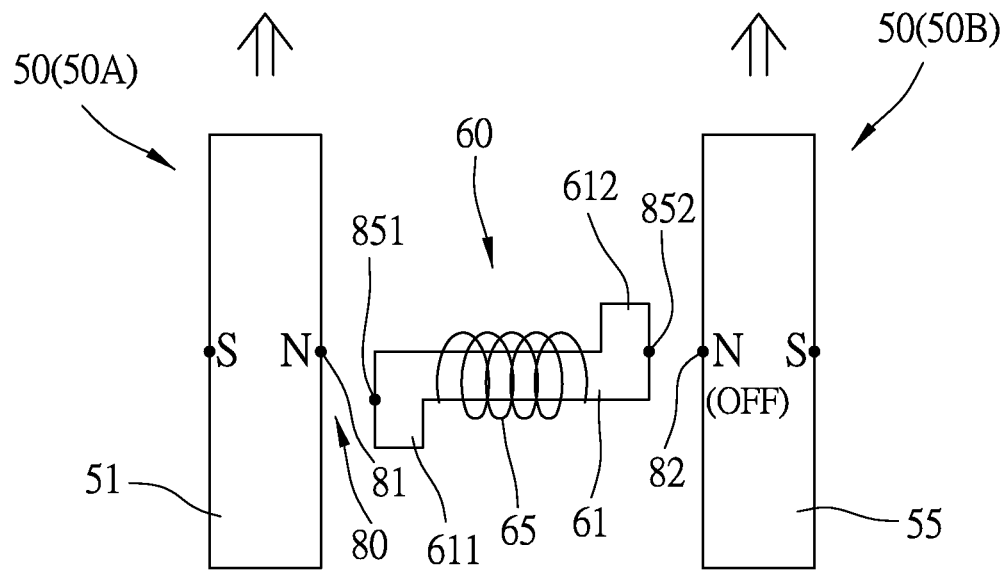
Figure 3A:
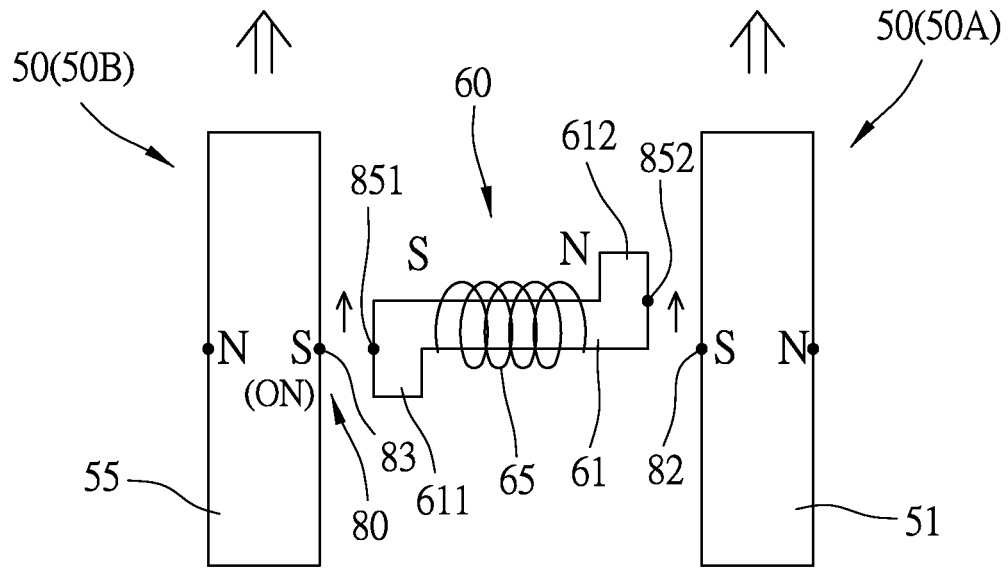
FIGS. 3A and 3B are other schematic diagrams showing the electric motor of FIGS. 2A and 2B.
Figure 3B:
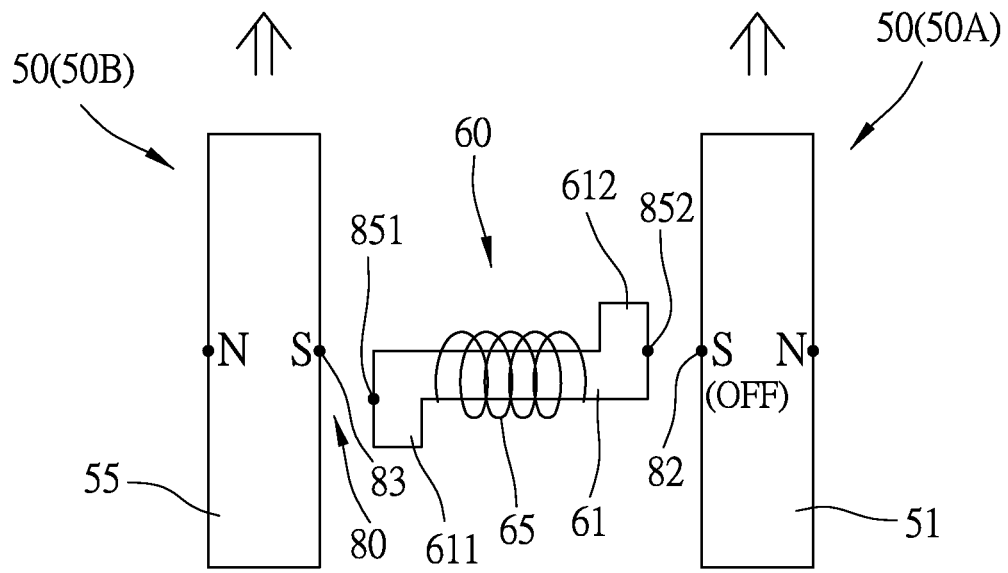
Figure 4A:
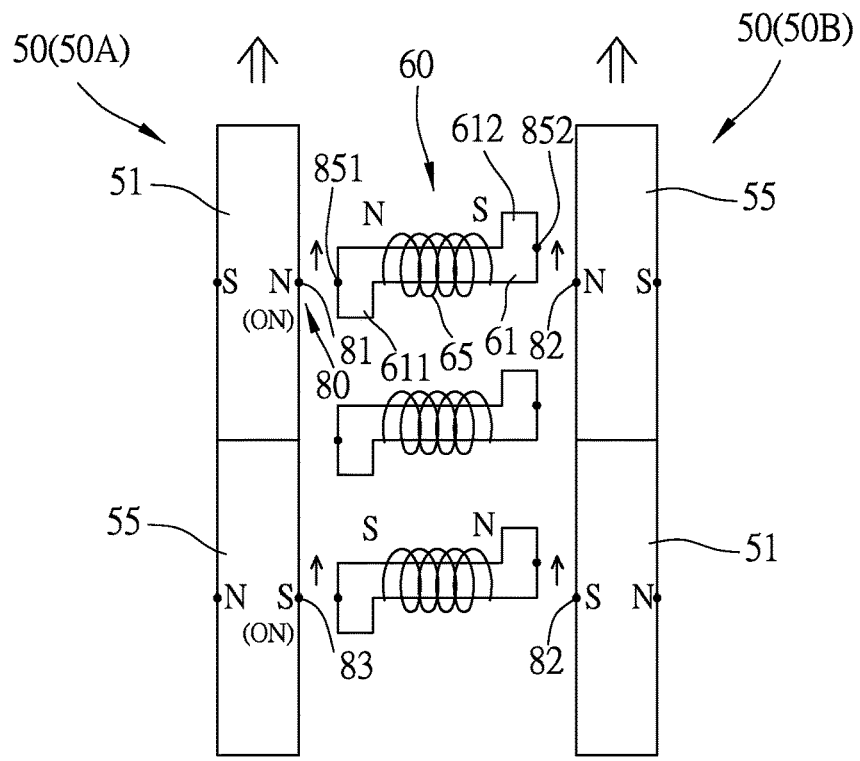
FIGS. 4A and 4B are schematic diagrams showing an electric motor according to a second embodiment of the present invention.
Figure 4B:
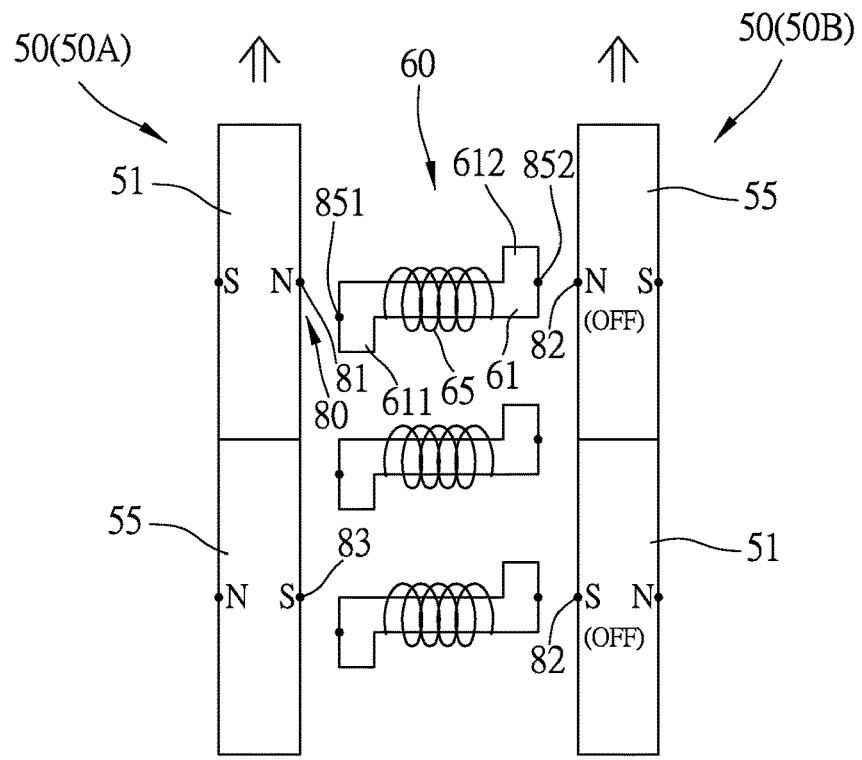
Figure 5A:
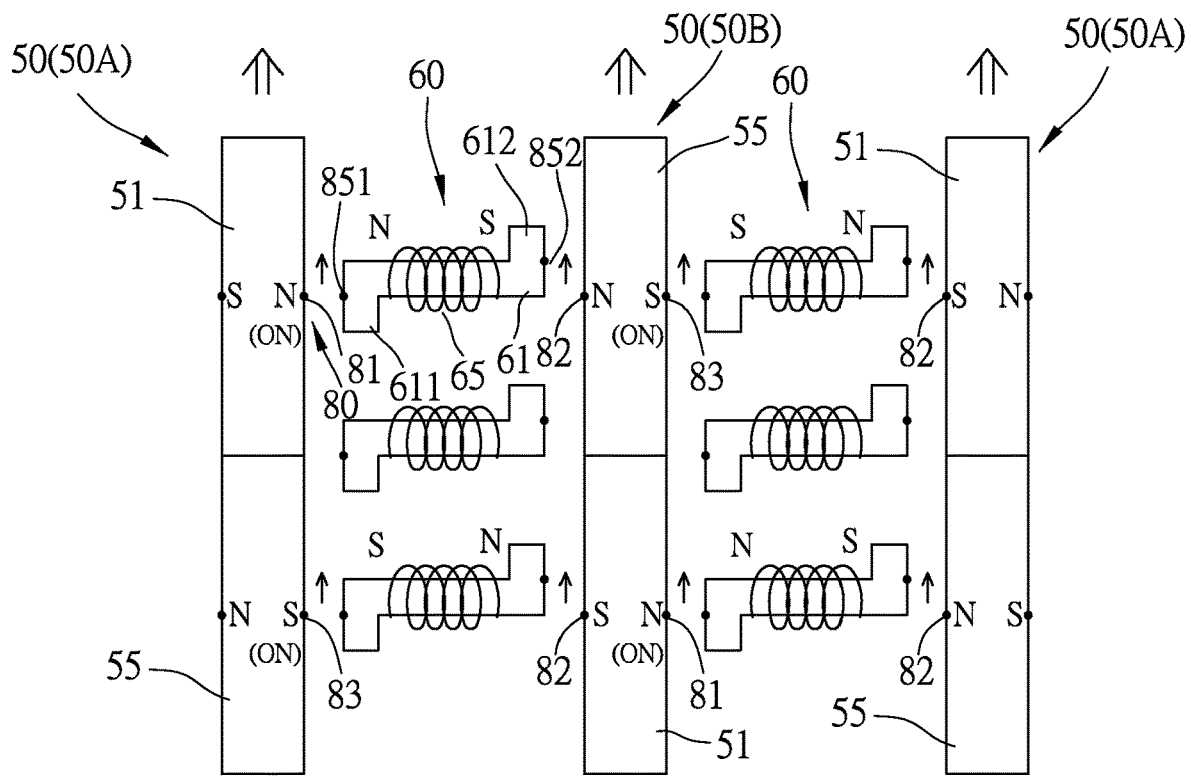
FIGS. 5A and 5B are schematic diagrams showing an electric motor according to a third embodiment of the present invention.
Figure 5B:
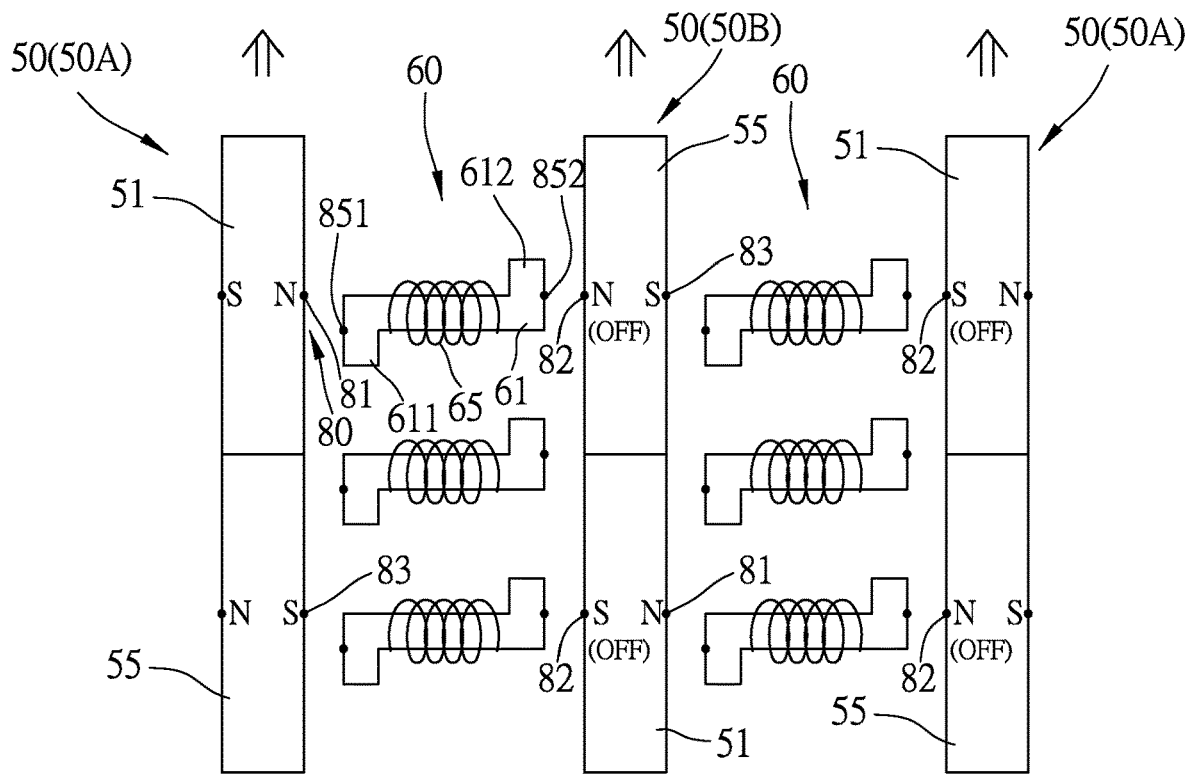
Figure 6A:
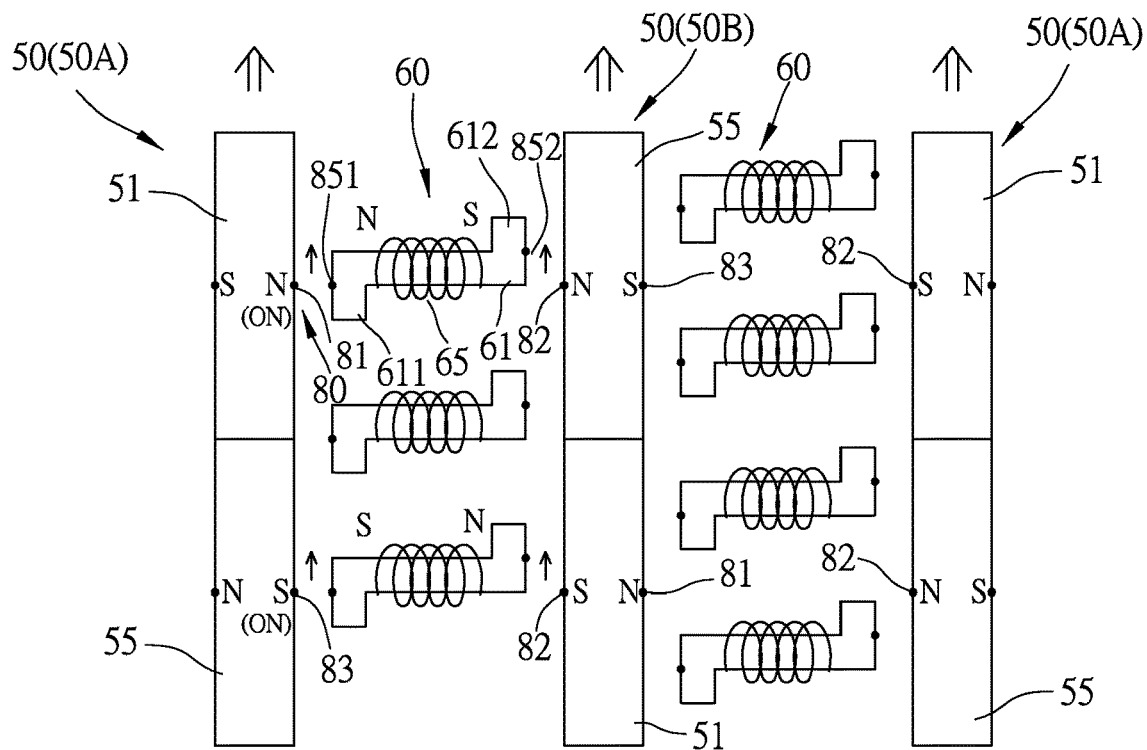
FIGS. 6A to 6C are schematic diagrams showing an electric motor according to a fourth embodiment of the present invention.
Figure 6B:
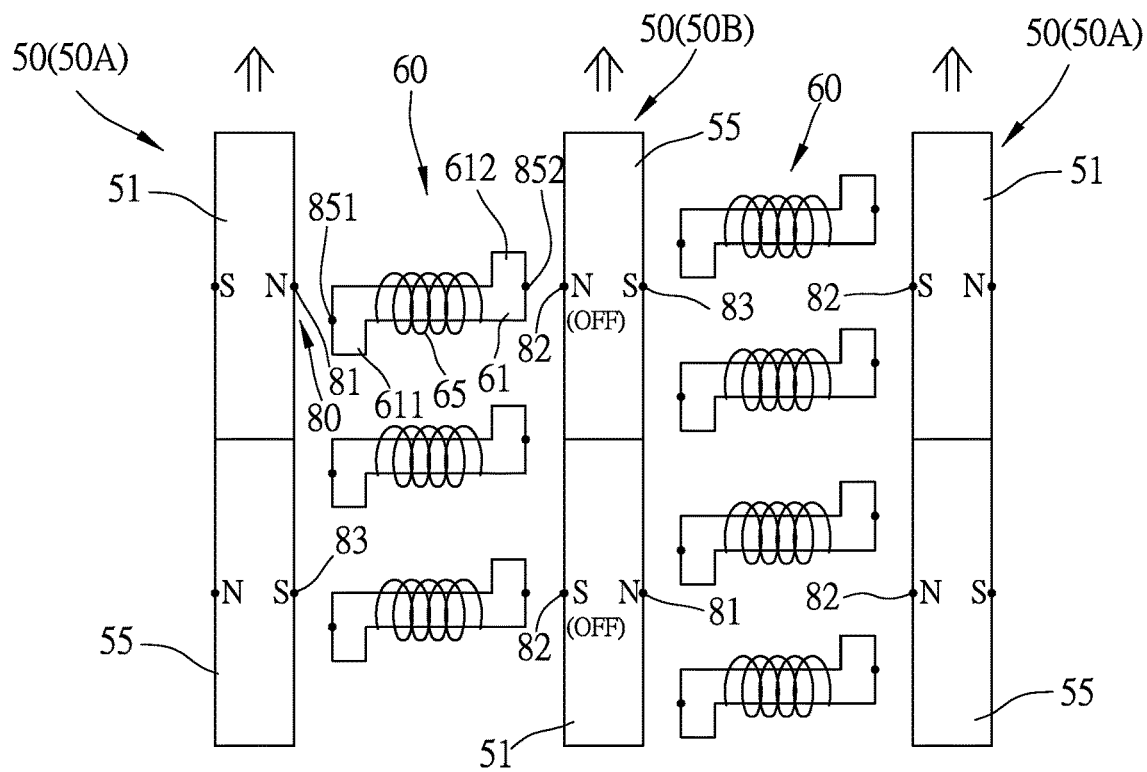

As shown in FIGS. 2A, 3A, and 4A, in the first and second embodiments, the magnet sets 50 are disposed at a distance and they are respectively referred to as a first magnet set 50A and a second magnet set 50B. The first and second magnet sets 50A and 50B may move synchronously relative to the coil assembly 60. When there are three or more magnet sets 50, as shown in FIGS. 5A and 6A, the first magnet sets 50A and the second magnet sets 50B are disposed alternately. Each magnet set 50 includes at least a magnet 51 and a magnet 55 having reversed magnetic poles are stacked vertically. Each magnet 51 or 55 has poles arranged perpendicular to the movement of the magnet. As shown in FIGS. 4A, 5A, and 6A, in a leftmost first magnet set 50A, the magnet 51 has its N pole adjacent to the coil assemblies 60 and the magnet 55 has its S pole adjacent to the coil assemblies 60. For two neighboring magnet sets 50, one's magnet 51 faces the other's magnet 55. As such, for example, the magnet 51 of a first magnet set 50A has its N pole adjacent to the coil assemblies 60 and the magnet 55 of the opposing second magnet set 50B also has its N pole adjacent to the coil assemblies 60.

Figure 7:
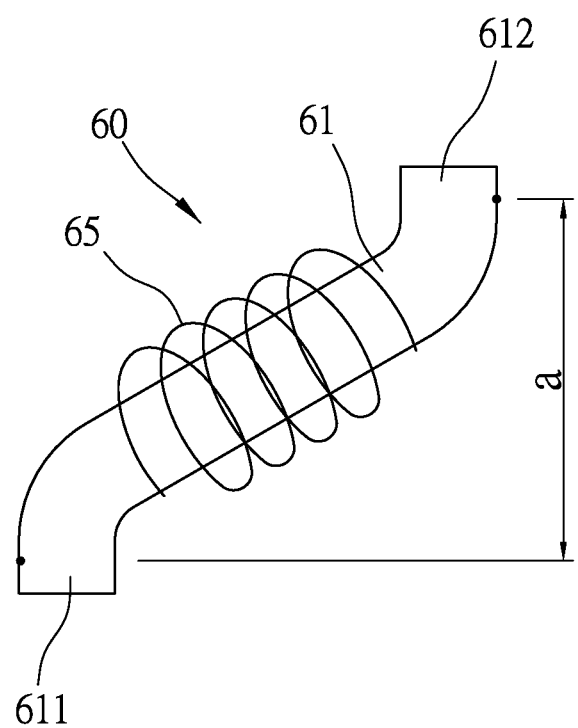
FIG. 7 is a schematic diagram showing a coil assembly according to another embodiment of the present invention.

The coil assemblies 60 are disposed between neighboring magnet sets 50, and axially parallel to an alignment direction between the facing poles of opposing magnets 51 and 55. Each coil assembly 60 includes a magnetizer 61 wrapped in a winding 65. Two yokes are extended from two ends of the magnetizer 61 towards opposite directions. One of the yokes that interacts first with the poles of the magnet sets 50 is defined as a front yoke 611 and the other one that interacts later is defined as a back yoke 612. When electricity is applied to the winding 65 and the magnetizer 61 is magnetized into an electromagnet, its poles has polarities corresponding to the poles of the adjacent magnet sets 50. The front and back yokes 611 has 612 has a distance (a) between their centers. The distance (a) should be as large as possible. Therefore, as shown in FIG. 7, the front and back yokes 611 and 612 are extended not perpendicularly to the magnetizer 61 but at an angle greater than the right angle so as to effectively increase the distance (a).

The detection switch circuit 80 is disposed between the magnet sets 50 and the coil assemblies 60, and includes at least a negative detector 81 or at least a positive detector 83, each disposed at a point having the strongest magnetic force on the magnets 51 or 55 that interact earlier with the front yokes 61 of the coil assemblies 60 according to their relative movement. For the magnets 51 that have the N pole facing the coil assemblies 60, it is a negative detector 81 located on the magnets 51. For the magnets 55 that have the S pole facing the coil assemblies 60, it is a positive detector 83 located on the magnets 55 so that the windings 65 on the coil assemblies 60 may be applied with a positive or negative power supply. The detection switch circuit 80 further includes at least a break detector 82, each disposed at a point having the strongest magnetic force on the magnets 51 or 55 that interact later with the back yokes 612 of the coil assemblies 60 according to their relative movement so that the electricity supplied to the windings 65 on the coil assemblies 60 may be cut off. In addition, a front detection element 851 and a back detection element 852 are respectively provided on the front and back yokes 611 and 612 where the magnetic force is strongest. When the front detection element 851 of a coil assembly 60 detects the negative detector 81 or the positive detector 83, electricity then is applied to the coil assembly 60. When the back detection element 852 of a coil assembly 60 detects the break detector 82, electricity to the coil assembly 60 is cut off, as shown in FIGS. 2A to 6C.

As described, an electric motor having reduced input power and enhanced output power is achieved.

The operation of the electric motor of the present invention is described as follows. As shown in FIGS. 2A and 2B to FIGS. 5A and 5B, when the magnet sets 60 and the coil assemblies 60 make relative movements, such as the magnet sets 50 function as rotor and move upward, and the coil assemblies 60 function as stator and stay still, a positive detector 83 on a magnet 51 or a negative detector 81 on a magnet 55 interacts first with a front detection element 851 on a coil assembly 60's front yoke 611, a positive power supply or a negative power supply is applied to the coil assembly 60 so that the coil assembly 60 is magnetized into an electromagnet with corresponding polarities. For example, when two opposing magnet sets 50 and coil assemblies 60 in between have polarities arranged as N-N-S-N as shown in FIGS. 2A, 2B, 4A, 4B, and 5A, repulsion formed between the front yoke 611 and the magnet 51, thereby providing a push force due to same polarity, and attraction is formed between the back yoke 612 and the magnet 55, thereby providing a pull force due to opposite polarities. As such, dual magnetic forces are generated in assisting the movement direction. Alternatively, as shown in FIGS. 3A, 3B, 4A, 4B, and 5A, where two opposing magnet sets 50 and coil assemblies 60 in between have polarities arranged as S-S-N-S, repulsion formed between the front yoke 611 and the magnet 55, thereby providing a push force due to same polarity, and attraction is formed between the back yoke 612 and the magnet 51, thereby providing a pull force due to opposite polarities. Similarly, dual magnetic forces are generated in assisting the movement direction.

On the other hand, as shown in FIGS. 2A to 5B, a break detector 82 on a magnet 51 or 55 interacts with a back detection element 852 on a coil assembly 60's back yoke 612, electricity applied to the coil assembly 60 is cut off so that the coil assembly 60 is no longer magnetized to prevent repulsion to be formed between the approaching front yoke 611 and the magnet 51 or 55, and to prevent attraction to be formed between the approaching back yoke 612 and the magnet 51 or 55 if the coil assembly 60 is not cut off. As such, the generation of the magnetic obstruction to the movement may be avoided.

Figure 6C:
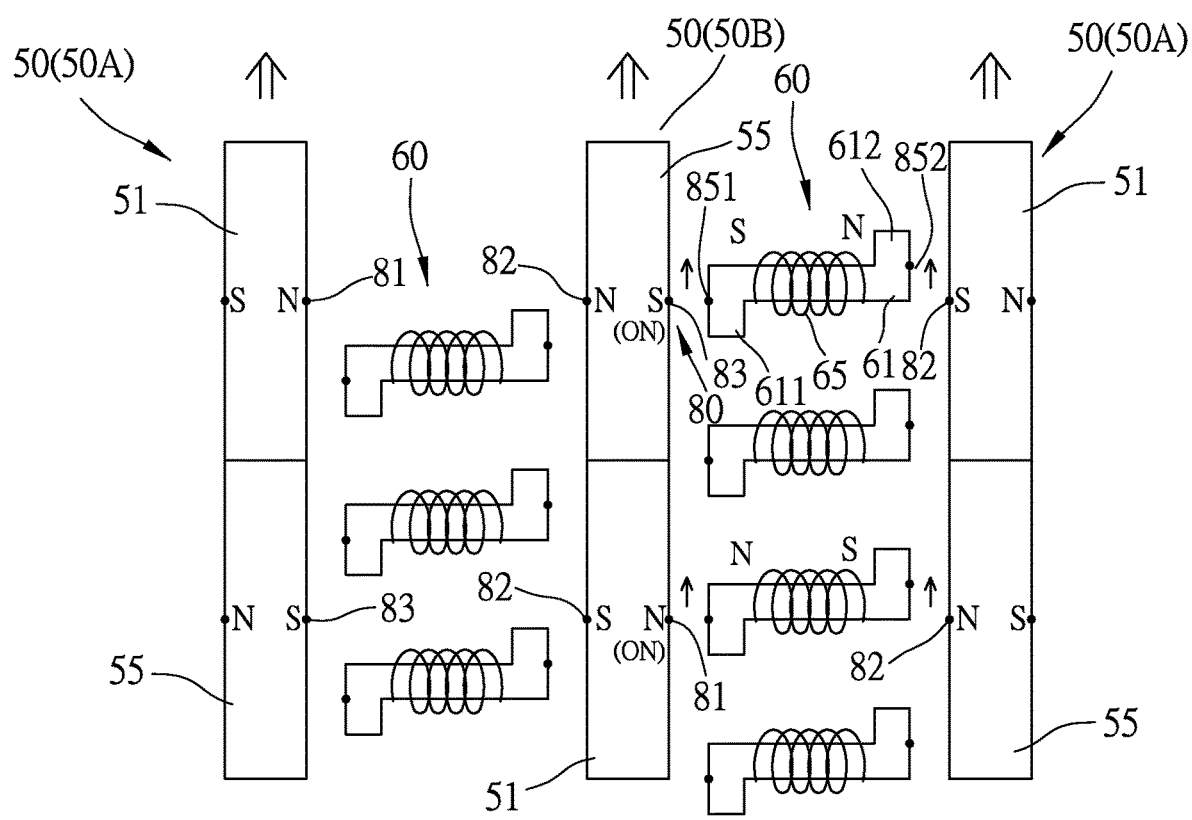

Furthermore, as shown in FIGS. 6A and 6C, the present invention may further arrange the magnet sets 50 and the coil assemblies 60 so that different coil assemblies 60 are interleaved so as to produce cyclic and relayed magnetic force, thereby enhancing the magnetic force and output power.

Through the above description, it should be understandable the electric motor, through the arrangement of the magnets 51 and 55 in opposing magnet sets 50 and the alignment of coil assemblies 60 with the magnets 51 and 55 in opposing magnet sets 50, does not produce electricity when no electricity is applied, and produces dual magnetic forces. Furthermore, by having same polarity between of opposing magnet sets 50, reversed polarities between magnet sets 50 and magnetizers 61, and the detection switch circuit 80's switching between positive and negative power supplies, the electric motor avoids the occurrence of magnetic resistance, enhances magnetic force, effectively reduce output power and increase output power.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:
1. An electric motor structure, comprising:
at least two magnet sets disposed oppositely at a distance, where each magnet set comprises a magnet having poles arranged perpendicular to the magnet's movement, the magnets in a same magnet set are stacked and have poles of reversed polarities on a same side, and opposing magnets from neighboring magnet sets have facing poles of a same polarity;
at least one coil assembly disposed between two neighbouring magnet sets, where the magnet sets and the at least one coil assembly conduct a relative movement, the at least one coil assembly comprises a magnetizer wrapped in a winding, and a front yoke and a back yoke respectively extended from two ends of the magnetizer towards opposite directions that are perpendicular to an alignment direction between the facing poles of opposing magnets, the front and back yokes are at an angle greater than right angle relative to the magnetizer, the front yoke interacts first with a magnet in the relative movement, the back yoke interacts later with a magnet, a specific distance is between the front and back yokes' centers, and a front detection element and a back detection element are respectively provided on the front and back yokes; and
a detection switch circuit disposed between the magnet sets and the at least one coil assembly, where the detection switch comprises at least a negative detector or at least a positive detector, and at least one break detector, each disposed at a pole on a magnet that interacts earlier with the front yoke of the at least one coil assembly in the relative movement, the negative detector is disposed at an N pole of a magnet having the N pole facing the at least one coil assembly, a the positive detector is disposed at an S pole of a magnet having the S pole facing the at least one coil assembly, the break detector is disposed at a pole on a magnet that interacts later with the back yoke of the at least one coil assembly in the relative movement;
wherein, when the front detection element detects the negative detector or the positive detector, a positive or negative power supply is respectively applied to the at least one coil assembly; and, when the back detection element detects the break detector, the positive or negative power supply to the at least one coil assembly is cut off.

\* \* \* \* \*